(12) United States Patent
Shimizu et al.

(10) Patent No.: US 6,541,876 B2
(45) Date of Patent: Apr. 1, 2003

(54) ENGINE OPERATED GENERATOR

(75) Inventors: Motohiro Shimizu, Saitama (JP); Masashi Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/887,089

(22) Filed: Jun. 25, 2001

(65) Prior Publication Data

US 2002/0000722 A1 Jan. 3, 2002

(30) Foreign Application Priority Data

Jun. 30, 2000 (JP) .................................. 2000-198051

(51) Int. Cl.[7] .............................. H02P 9/00; H02P 9/04; F02H 11/00; F02N 11/06; F02D 41/08
(52) U.S. Cl. ................ 290/40 A; 290/40 B; 290/40 C; 290/40 D; 290/40 F
(58) Field of Search .......................... 290/40 A–40 D, 290/40 F

(56) References Cited

U.S. PATENT DOCUMENTS

| | | | | |
|---|---|---|---|---|
| 4,510,903 A | * | 4/1985 | Sakakiyama | 123/339 |
| 4,553,516 A | * | 11/1985 | Hasegawa | 123/339 |
| 4,794,898 A | * | 1/1989 | Kato | 123/339 |
| 5,057,764 A | * | 10/1991 | Fujimoto et al. | 322/14 |
| 5,140,960 A | * | 8/1992 | Fujimoto et al. | 123/339 |
| 5,263,447 A | * | 11/1993 | Fujimoto | 123/339 |
| 5,352,971 A | * | 10/1994 | Nishimura | 322/27 |
| 5,467,008 A | * | 11/1995 | Uchinami | 322/27 |
| 5,998,881 A | * | 12/1999 | Wind et al. | 290/40 A |
| 6,130,486 A | | 10/2000 | Shimizu et al. | 290/40 |
| 6,215,285 B1 | * | 4/2001 | Harmon | 322/29 |
| 6,281,595 B1 | * | 8/2001 | Sinha et al. | 290/40 A |
| 6,365,982 B1 | * | 4/2002 | Iles et al. | 290/40 B |
| 6,414,400 B1 | * | 7/2002 | Scott et al. | 290/40 C |
| 6,414,401 B1 | * | 7/2002 | Kuroda et al. | 290/40 C |
| 6,424,053 B1 | * | 7/2002 | Wakashiro et al. | 290/40 C |
| 6,429,540 B1 | * | 8/2002 | Dunsworth et al. | 290/40 A |
| 6,437,456 B1 | * | 8/2002 | Kimura et al. | 290/40 C |
| 6,441,506 B2 | * | 8/2002 | Nakashima | 290/40 C |
| 6,442,455 B1 | * | 8/2002 | Kotre et al. | 701/22 |
| 6,452,286 B1 | * | 9/2002 | Kubo et al. | 290/40 C |
| 6,459,166 B2 | * | 10/2002 | Yanase et al. | 290/40 C |
| 6,469,402 B2 | * | 10/2002 | Morimoto et al. | 290/40 C |
| 6,470,868 B2 | * | 10/2002 | Nakagawa et al. | 123/673 |
| 6,470,983 B1 | * | 10/2002 | Amano et al. | 180/65.2 |

FOREIGN PATENT DOCUMENTS

| | | |
|---|---|---|
| JP | 5-18285 | 1/1993 |
| JP | 5-146200 | 6/1993 |
| JP | 11-308896 | 11/1999 |

* cited by examiner

*Primary Examiner*—Nestor Ramirez
*Assistant Examiner*—Pedro J. Cuevas
(74) *Attorney, Agent, or Firm*—Armstrong, Westerman & Hattori, LLP

(57) ABSTRACT

A generator system arranged to respond to a variation in the load with a generous margin regardless of a change in the output of the generator or the engine due to degradation with the passage of time. The output current of the generator is rectified by a converter composed of thyristors in a bridge configuration of which the direct current output is converted by an inverter into an alternating current at a commercial frequency and connected to a load. The engine speed is controlled so that the conduction angle of the thyristors in the converter can be held at a target degree. As the target degree stays within a range smaller than the maximum limit, the generator runs with a margin, thus readily responding to a variation in the load. When the throttle opening is excessively opened, the target conduction angle is decreased to increase a target speed of the engine, hence inhibiting the engine from being overloaded and running at an excessive higher speed.

7 Claims, 3 Drawing Sheets

20%   75% (α)

ENGINE OPERATED GENERATOR

BACKGROUND OF THE INVENTION

1. Field of the Invention

The present invention relates to an engine operated generator and, more particularly, to an engine operated generator which can maintain a smooth action of controlling the number of revolutions of the engine to a target rate in response to a magnitude of load even when the engine fails to produce a predetermined level of power output.

2. Description of the Related Art

Many engine operated generators used generally as alternating current power sources are equipped with an inverter for stabilizing the output frequency. In such a conventional engine operated generator, an alternating current is generated by a generator driven by an engine, temporally converted into a direct current, and converted back by an inverter to an alternating current output at the commercial frequency before being released. The conventional generator system equipped with the inverter allows its output frequency to be hardly dependent on the number of revolutions of the engine and can determine its output through controlling the number of revolutions of the engine in response to a load.

For example, an inverter equipped engine operated generator is disclosed in Japanese Patent Laid-open Publication (Heisei)5-18285 where the load is estimated in accordance with an output current from the inverter and used for controlling a throttle opening of the engine. This permits the output voltage of the generator to maintain at substantially a uniform level regardless of variations of the load.

Also, disclosed in Japanese Patent Laid-open Publication (Heisei)5-146200 is an engine operated generator which can detect its output voltage at the input of an inverter and compare with a predetermined reference voltage to determine the number of revolutions of the engine corresponding to the load.

The inventors have proposed an engine operated generator which is equipped with a converter consisted of a semiconductor rectifier element for rectifying the output current of a generator and arranged to control the number of revolutions of the engine so that the conduction angle of the semiconductor rectifier element is converged toward a target degree which is less than the maximum limit of conduction angle thus to maintain the output voltage of the converter to a desired level (Japanese Patent Laid-open Publication (Heisei)11-308896). As the generator runs with a moderate margin, it can readily respond to an increase in the load within the margin. Also, the output of the generator can be prevented from being affected by a variation in the number of revolutions of the engine.

It is desired to further improve the conventional generator in which the number of revolutions of the engine can be controlled so that the conduction angle (first state angle) of the semiconductor rectifier element is converged at a target degree determined smaller than the maximum level. The engine in the engine operated generator may fail to produce a predetermined level of power output due to degradation with the passage of time. As the target degree of conduction of the semiconductor rectifier element is based on the primary characteristics of the engine, the degradation of the engine with the passage of time will result in the above drawback.

It is now assumed that the number of revolutions of the engine is controlled between 3000 and 5000 rpm and when the engine remains not degraded, the output load of 1000 VA requires 4000 rpm of the number of revolutions of the engine and 75% of the throttle opening. When the engine is degraded and the output load of 1000 VA is required, the target number of revolutions of the engine is set to 4000 rpm. As the engine is degraded, it can hardly run at 4000 rpm of the target number of revolutions with the previous setting of the throttle opening hence failing to produce a desired power output. For increasing the power output, the throttle opening has to be enlarged. If worse, the throttle opening may be required almost 100% thus creating an overloaded state. This type of drawback may be caused by not only the degradation with the passage of time but also the power shortage due to an individual discrepancy in the output of the engine or the power surplus due to an individual discrepancy in the output of the generator.

SUMMARY OF THE INVENTION

It is an object of the present invention to provide an engine operated generator which has a generator arranged to generate an actual power output with a comfortable margin in response to a wider range of electrical load for controlling a stable level of the output voltage and an engine arranged to be smoothly controlled in the number of revolutions regardless of engine degradation with the passage of time or a variation in the output of the generator.

The present invention which has the first feature comprises a converter composed of a semiconductor rectifying element for rectifying the output current of a generator driven by an engine, an inverter for converting a direct current received from the converter into an alternating current at a desired frequency, a semiconductor rectifying element driving circuit for controlling the conduction of the semiconductor rectifying element to adjust the output voltage of the converter to a target level, a conduction rate detecting means for detecting the conduction rate of the semiconductor rectifying element, an engine revolution controlling means for controlling the number of revolutions of the engine so that the conduction rate detected by the conduction rate detecting means is converged at a target rate, a means for detecting the throttle opening of the engine, and a modifying means for decreasing the target rate when the throttle opening exceeds a predetermine degree.

The present invention which has the second feature is that the predetermined degree used in the modifying means is determined and set with relation to the number of revolutions of the engine, the modifying means examines whether or not the throttle opening exceeds the predetermined degree in accordance with the throttle opening and the number of revolutions of the engine.

According to the first and second features of the present invention, when the throttle opening exceeds the predetermined degree, it is judged that the engine is overloaded and the target degree of conduction can be decreased correspondingly. As the target degree of conduction is decreased, the engine revolution controlling means drives the engine to run at an increased number of revolutions so that the rate of conduction does not exceed the decreased target. The increased number of revolutions increases the output of the engine. As the engine runs with a generous margin, the throttle can be controlled to reduce its opening.

The present invention which has the third feature is that the modifying means is arranged to decrease the target rate when the throttle opening remains exceeding the predetermined degree. According to the third feature of this invention, momentary increase of the throttle opening does not misjudgment in detecting process for an overload of the generator. Therefore, reliable control can be proceeded.

The present invention which has the fourth feature is that the modifying means is arranged to reset the target rate to an initial setting when the throttle opening has once exceeded the predetermined degree and been returned back to smaller than the predetermined degree. According to the fourth feature of this invention, the engine speed does not be maintained at the high speed than the speed undesirably.

The present invention which has the fifth feature is that the conduction rate is represented by the conduction angle of the semiconductor rectifying element and the target rate is represented by a target angle of the semiconductor rectifying element. According to the fifth feature of this invention, conduction angle of the semiconductor rectifying element which comprises the converter is modified when the generator is overloaded.

DETAILED DESCRIPTION OF THE PREFERRED EMBODIMENTS

Figure 1:
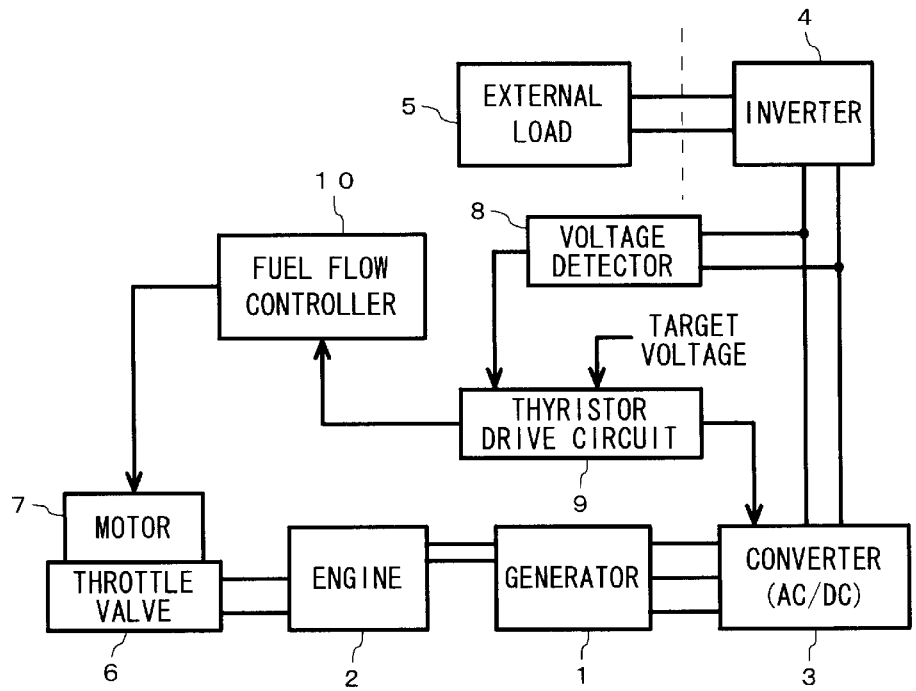
FIG. 1 is a block diagram of an arrangement of an engine operated generator showing one embodiment of the present invention.

One embodiment of the present invention will be described in more detail referring to the relevant drawings. FIG. 1 is a block diagram showing an arrangement of an engine operated generator. A magnetic multi-pole generator 1 (referred to as a generator hereinafter) having a permanent magnetic for developing a field magnetic flux is joined to an (internal combustion) engine 2. As the generator 1 is driven by the engine 2, it generates a multi-phase (commonly three-phase) alternating current. The alternating current is changed to its direct current form by the full-wave rectification of a converter 3 which incorporates a rectifying circuit having thyristors connected as the semiconductor rectifier elements in abridge configuration and transmitted to an inverter 4. The inverter 4 is connected at its output with an external load 5 for supply of a single-phase alternating current output at the commercial frequency (50 Hz, for example). A stepping motor 7 is also provided for controlling the throttle opening in the engine 2. More specifically, the opening of a throttle valve 6 is controlled with the number of pulses received by the stepping motor 7, thus determining the number of revolutions of the engine 2. The engine 2 can be equipped with fuel injection. In that case, the controlling of the throttle opening is replaced by an action of controlling the fuel injection time for determining the number of revolutions.

The output voltage of the converter 3 is measured by a voltage detector 8. A thyristor drive circuit 9 compares the output voltage of the converter 3 with a reference voltage (170 V, for example) which has been set as a target level and then controls the conduction or firing of the thyristors in a known manner so that the real output voltage of the converter 3 is equal to a desired voltage setting level. This arrangement allows the output voltage of the converter 3 to remain at the voltage setting level when it is in a particular current range where the conduction angle of the thyristors can be controlled. The converter 3 may be modified where its output voltage is determined by controlling the duty ratio of a power transistor. Be noted that the conduction angle and the duty ratio are referred to as the fired state rate of a semiconductor rectifier element in this description.

The semiconductor rectifier element is controlled to maintain its "on state" according to the conduction angle or conduction rate.

Figure 2:
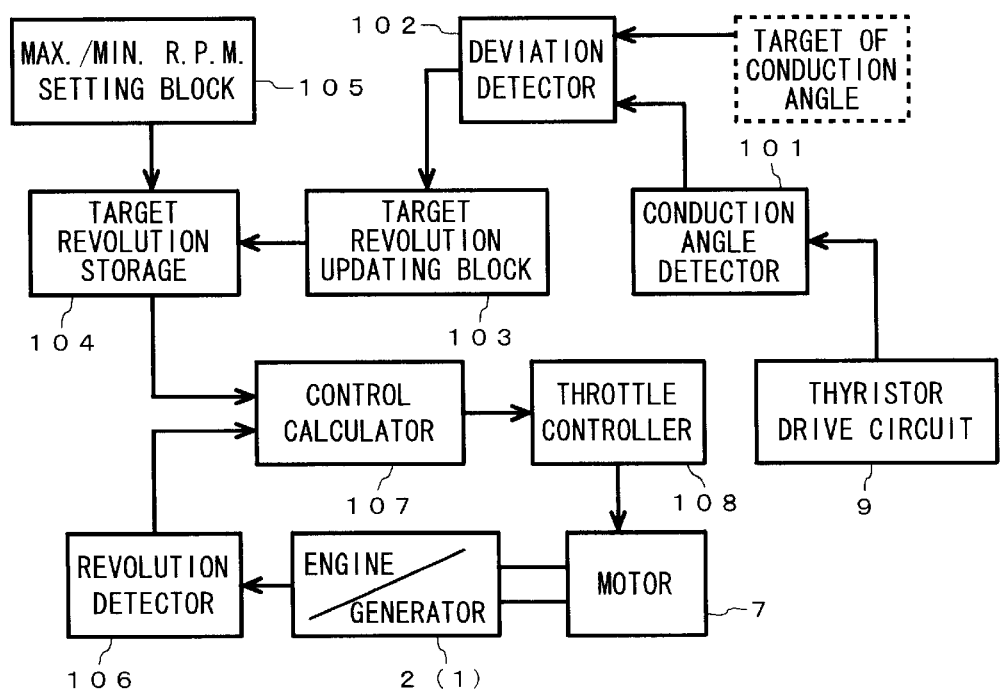
FIG. 2 is a block diagram showing a primary part of a fuel controller in the engine generator system.

A fuel flow controller 10 is now explained. FIG. 2 is a block diagram of an arrangement of the fuel flow controller 10. A thyristor conduction angle detector 101 measures the conduction angle of the thyristors according to the control signal supplied from the thyristor drive circuit 9 to the is converter 3. The conduction angle is continuously measured at intervals of a given period and its average is calculated.

The average conduction angle calculated by the thyristor conduction angle detector 101 is transferred to a deviation detector 102 where a deviation from the target degree of conduction is detected. More particularly, it is judged from the average conduction angle of the thyristors whether or not the generator 1 is operated by a comfortable margin of the output. Preferably, for the purpose, the target degree of conduction may, for example, be 75%. More preferably, the target degree of conduction like a common setting for control may have a level of hysteresis.

As the number of revolutions of the engine 2 is controlled to a target value so that the deviation calculated by the deviation detector 102 is diminished to zero, the generator 1 runs in a favorable condition. The target degree of conduction is variable depending on the temperature of the generator 1, as will be explained later in more detail.

Figure 3:
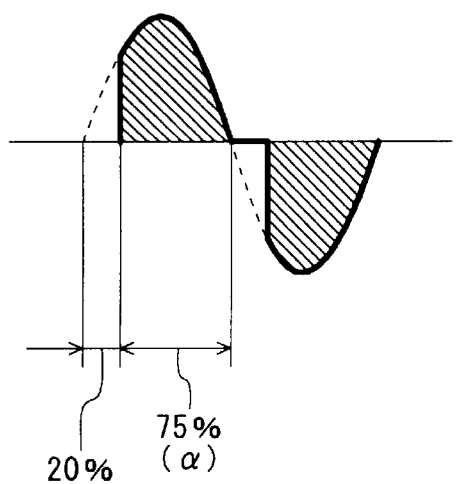
FIG. 3 is an explanatory diagram showing the conduction angle of thyristors.

FIG. 3 illustrates a waveform of the output voltage of the thyristors when the conduction angle is equal to 75%. As shown, the conduction angle α is an electrical angle corresponding to a period where the thyristors are kept "on state" and may be determined by a known means.

Figure 4:
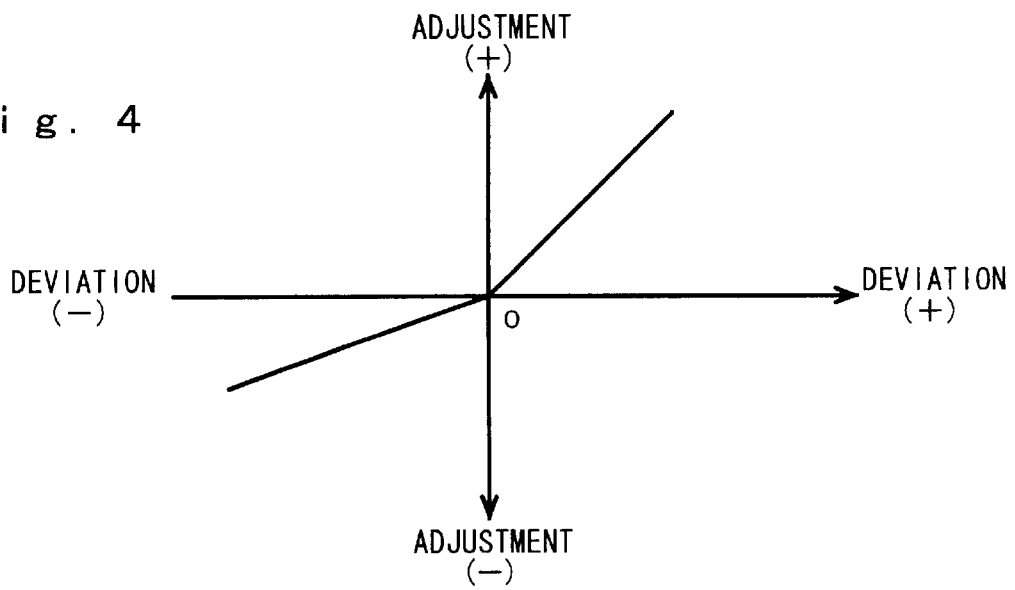
FIG. 4 is a diagram showing the relationship between a deviation of the conduction angle and a modification of the target number of revolutions.

A target revolution updating block 103 is arranged responsive to the deviation from the deviation detector 102 for determining an adjustment in the number of revolutions. The target revolution updating block 103 may be implemented by a table where the adjustment in the number of revolutions is determined from the deviation as a corresponding readout address data. FIG. 4 is a diagram showing the relationship between the deviation and the adjustment in the number of revolutions. The deviation is a difference between the target degree of conduction and the actual degree of conduction (actual angle minus target angle).

As shown in FIG. 4, when the deviation is positive from the target degree of conduction, the adjustment in the number of revolutions is greater than when the deviation is negative. As the deviation is positive, it is judged that the conduction angle exceeds the target degree (75%) and the generator 1 has no margin. It is thus necessary for the generator 1 to increase the output in response to the load. On the contrary, when the deviation is negative, it is judged that the generator 1 has a wide margin. Because any excessive response causes an overshoot which abruptly varies the number of revolutions and has to be avoided, the adjustment in the number of revolutions will be set to a minimum.

Returning back to FIG. 2, a target revolution storage 104 is provided for receiving the adjustment in the target number of revolutions from the target revolution updating block 103 and adding it, to the preceding target number of revolution stored to have a new target number of revolutions. The target number of revolutions may be updated within a range between the maximum and the minimum determined by a maximum/minimum revolution setting block 105. Even if the addition of the adjustment in the target number of revolution causes the target number of revolutions to depart from the range, the target number of revolutions stays at its maximum or minimum limit. The minimum limit is given for inhibiting the conduction angle of the thyristors from changing in response to a small variation in the number of revolutions thus to decline the stability at no or a minimum load.

A revolution detector 106 is provided for measuring the number of revolutions of the generator 1. A control calculator 107 calculates a control according to the actual number of revolutions received from the revolution detector 106 and the target number of revolutions received from the target revolution storage 104, using a known manner (e.g., a proportional, integral, or differential operation), so that the deviation of the number of revolutions from the target number is diminished to zero. A throttle controller 108 is connected to and supplies the stepping motor 7 with a pulse signal for driving the revolution according to an output of the control calculator 107. Upon receiving the pulse signal, the stepping motor 7 is driven to vary the throttle opening.

According to the embodiment, the number of revolutions of the engine 2 is controlled so that the average conduction a angle of the thyristor bridge rectifying circuit for determining the output of the converter 3 can be maintained to a setting degree (for example, 75%). This allows the generator 1 to run constantly with a comfortable margin and feed a load with a level of power. More specifically, if the load increases, the conduction angle of the thyristors is increased in response to a variation in the output of the converter 3 resulting from an increase in the load. Also, as the conduction angle increases, the number of revolutions of the engine 2 can be increased moderately. As a result, the number of revolutions of the engine 2 will be inhibited from changing at a higher frequency and the generation of noise and the consumption of fuel of the engine 2 will be decreased.

This embodiment allows the output voltage of the generator to be measured with the input of the inverter, hence eliminating the need of calculating as parameters the effective output of power of the inverter, the efficiency of conversion of the converter, the generation of power per revolution, and differences between components in the generator and the effective power detector and simplifying the action of controlling. While the converter in this embodiment has thyristors connected in a bridge configuration for rectifying the current output of the generator, it may be of any voltage-controlled type, such as a switching DC voltage conversion type.

The action of modification when the engine is overloaded will now be described. As explained previously, the engine 2 may be overloaded when the engine 2 itself or the generator 1 exhibits degradation with the passage of time. In this embodiment, the overloaded state of the engine 2 can be eliminated by examining from the throttle opening whether or not the engine 2 is overloaded and modifying the target degree of conduction on the basis of the result of examination.

Figure 5:
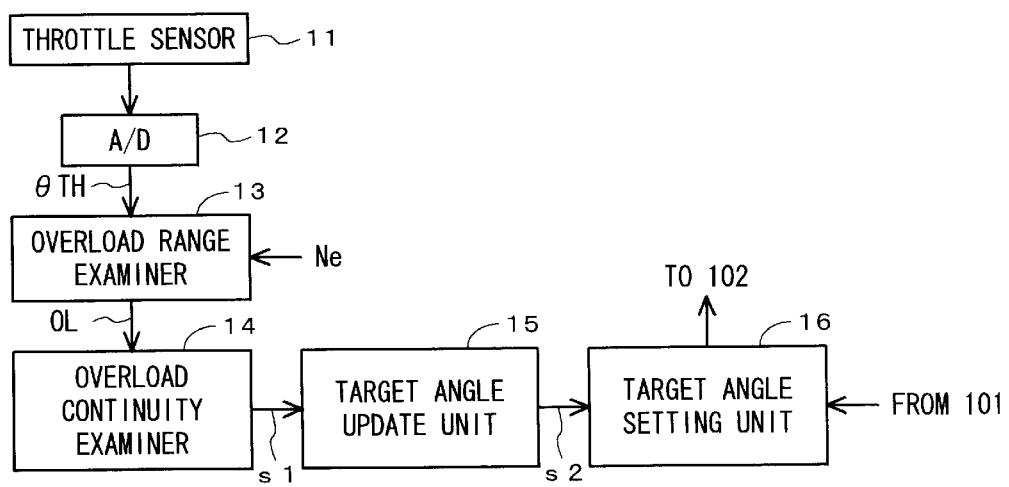
FIG. 5 is a block diagram of a primary part for modifying the conduction angle through controlling the throttle opening.

FIG. 5 is a functional block diagram showing a primary part of the target conduction angle modification controlling apparatus. As shown, a throttle sensor 11 is coupled to the throttle valve of the engine 2 for providing a signal indicative of the throttle opening. The signal is then converted by an A/D converter 12 to a digital form and supplied to an overload range examiner 13.

The overload range examiner 13 examines from the throttle opening θTH received from the A/D converter 12 and the number of revolutions Ne supplied from the revolution detector 106 whether the engine 2 is in the normal range or the overload range. When it is judged that the engine 2 is in the overload range, the overload signal OL is turned to a high level (H). When the engine 2 is in the normal range, the overload signal OL is turned to a low level (L) The overload range examiner 13 may be implemented by a table for selectively releasing the judgment signal OL based on the throttle opening θTH and the number of revolutions Ne.

Figure 6:
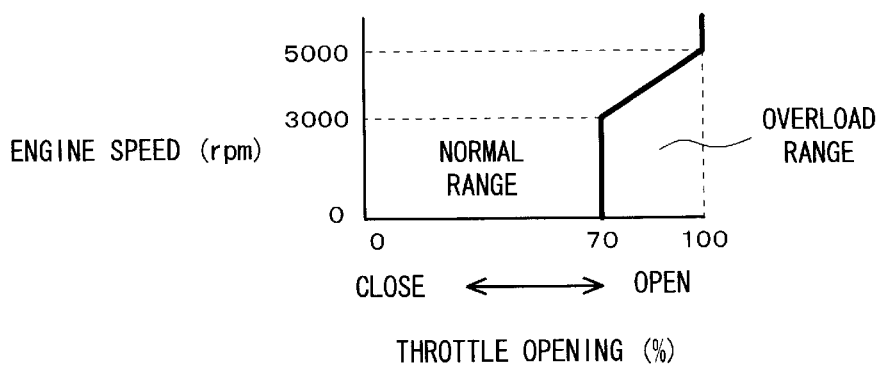
FIG. 6 is a diagram showing a load judgment table with the number of revolutions and the throttle opening as two parameters.

FIG. 6 illustrates an example of the table implementing the overload range examiner 13. As shown in FIG. 6, the table determines the overload range when the throttle opening exceeds a predetermined degree. The normal range is where the throttle opening is smaller than the predetermined degree. When the engine runs at 3000 rpm, it is in the normal range while the throttle opening θTH remains below 70%. As the number of revolutions of the engine increases, the normal range is extended up to larger throttle opening.

Returning to FIG. 5, the overload signal OL indicating the overload is transferred to an overload continuity examiner 14 which in turn releases a modification command s1 when the high level (H) of the signal OL is continued throughout a specific period of time. Examination of whether the high level is continuous for the specific period may be conducted with a specific interruption cycle by examining whether the number of overload judgments is continuous for predetermined number.

The modification command s1 is transmitted to a target angle update unit 15 which releases a target angle reduction command s2 upon receiving the modification command s1 (e.g. at intervals of 100 ms). The target angle reduction command s2 is transmitted to a target angle setting unit 16 which decreases the target angle by 0.5% for example in response to the target angle reduction command s2. As the target angle is decreased, the controlling action shown in FIG. 2 modifies the target number of revolutions for increasing the number of revolutions of the engine. When the engine runs at an increased number of revolutions and generates its output with a generous margin, the throttle opening θTH will be varied to the closing state.

Figure 7:
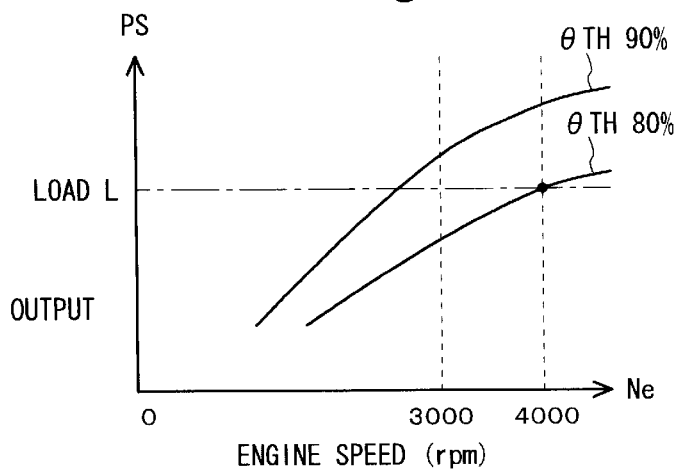
FIG. 7 is a diagram showing the relationship between the output at the throttle opening and the number of revolutions of the engine.

FIG. 7 is a diagram showing a profile (the relationship between the output PS and the number of revolutions Ne) of the engine with the throttle opening as one parameter. As shown, at 3000 rpm of the revolution Ne, the output hardly overcomes a load L with 80% of the throttle opening θTH. To overcome the load L, the throttle opening θTH has to be opened close to 90%. In the engine of this profile, when the number of revolutions Ne is increased to 4000 rpm, the output can be increased to a rate for overcoming the load L with 80% of the throttle opening θTH. More specifically, the engine 2 runs with a margin and can eliminate its overload state.

When the throttle opening θTH in the arrangement shown in FIG. 5 is smaller than the predetermined degree, the engine is in the normal range and the target conduction angle remains unchanged. Once the engine is turned to the overload range, then returned back to the normal range, and continuous in the normal range for a specific period of time, the target angle is gradually increased unlike the above described manner. As the target angle is returned back to its initial setting, the action of controlling the fired state angle is terminated.

According to the embodiment, the conduction angle of the thyristors is controlled so that the actual voltage output of the converter 3 is equal to a setting level. As the present invention is not limited to the controlling over the conduction angle. When a power transistor is used for controlling the voltage output of the converter 3, the duty ratio instead of the conduction angle may be modified depending on the temperature of the generator.

As apparent from the description, the features of the present invention permit the engine to be increased in the number of revolutions and thus the output when its overloaded state is detected from the increase of the throttle opening, hence eliminating the overloaded state. Accordingly, as a change in the load to the generator is produced due to degradation with the passage of time or output shortage of the engine, it can be offset by the controlling action of the system.

Particularly, an abrupt increase in the throttle opening can hardly be judged as an overload. As a result, the controlling action can be carried out with stability. The engine can be inhibited from running at an excessively high number of revolutions.

What is claimed is:

1. An engine operated generator having a converter composed of a semiconductor rectifying element for rectifying the output current of a generator driven by an engine and an inverter for converting a direct current received from the converter into an alternating current at a desired frequency, comprising:

a semiconductor rectifying element driving circuit for controlling the conduction rate of the semiconductor rectifying element to adjust the output voltage of the converter to a target level;

a conduction rate detecting means for detecting the conduction rate of the semiconductor rectifying element;

an engine revolution controlling means for controlling the number of revolutions of the engine so that the conduction rate detected by the conduction rate detecting means is converged at a target rate providing for generating the output voltage corresponding to the target level;

a means for detecting the throttle opening of the engine; and a modifying means for decreasing the target rate when the throttle opening exceeds a predetermined degree for increasing a target revolution of the engine corresponding to the target rate.

2. An engine operated generator according to claim 1, wherein while the predetermined degree used in the modifying means is determined and set with relation to the number of revolutions of the engine, the modifying means examines whether or not the throttle opening exceeds the predetermined degree in accordance with the throttle opening and the number of revolutions of the engine.

3. An engine operated generator according to claim 1 or 2, wherein the modifying means is arranged to decrease the target rate when the throttle opening remains exceeding the predetermined degree for a specific period of time.

4. An engine operated generator according to claim 1, wherein the modifying means is arranged to reset the target rate to an initial setting when the throttle opening has once exceeded the predetermined degree and been returned back to less than the predetermined degree.

5. An engine operated generator according to claim 2, wherein the modifying means is arranged to reset the target rate to an initial setting when the throttle opening has once exceeded the predetermined degree and been returned back to smaller than the predetermined degree.

6. An engine operated generator according to claim 3, wherein the modifying means is arranged to reset the target rate to an initial setting when the throttle opening has once exceeded the predetermined degree and been returned back to smaller than the predetermined degree.

7. An engine operated generator according to claim 1, wherein the conduction rate is represented by the conduction angle of the semiconductor rectifying element and the target rate is represented by a target angle of the semiconductor rectifying element.

* * * * *